United States Patent [19]
Kato et al.

[11] Patent Number: 4,702,567
[45] Date of Patent: Oct. 27, 1987

[54] ZOOM LENS

[75] Inventors: Masatake Kato, Tokyo; Keiji Ikemori; Tsunefumi Tanaka, both of Kanagawa; Kazuo Tanaka, Tokyo, all of Japan

[73] Assignee: Canon Kabushiki Kaisha, Tokyo, Japan

[21] Appl. No.: 17,025

[22] Filed: Feb. 18, 1987

Related U.S. Application Data

[63] Continuation of Ser. No. 485,216, Apr. 15, 1983, abandoned.

[30] Foreign Application Priority Data

Apr. 24, 1982 [JP] Japan ................................ 57-68951
Aug. 30, 1982 [JP] Japan ................................ 57-150513

[51] Int. Cl.⁴ ............................................. G02B 15/18
[52] U.S. Cl. ..................................... 350/427; 350/423
[58] Field of Search ........................ 350/423, 427, 428

[56] References Cited

U.S. PATENT DOCUMENTS 3,286,592 11/1966 Wagner et al. ...................... 350/427
4,054,371 10/1977 Yasukuni .............................. 350/428

FOREIGN PATENT DOCUMENTS 165107 12/1981 Japan .

Primary Examiner—John K. Corbin
Assistant Examiner—P. M. Dzierzynski
Attorney, Agent, or Firm—Toren, McGeady & Associates

[57] ABSTRACT

A zoom lens having a component V which has at least one group of lens elements axially movable mainly for changing image magnification, a component C which has at least one group of lens elements axially movable for compensating for the image shift resulting from the change of image magnification to maintain the constant position of the image plane, and a compound component F positioned on the image side of either, or both, of said component V and said component C to be movable with zooming, and having a plurality of lens groups contributing to a small overall refractive power, whereby the focusing provision is made in at least one of the groups in said compound component F.

5 Claims, 42 Drawing Figures

ZOOMING LOCUS OF EXAMPLE 1

ZOOMING LOCUS OF EXAMPLE 1

ZOOMING LOCUS OF EXAMPLE 2

NUMERICAL EXAMPLE 1

NUMERICAL EXAMPLE 2

SPHERICAL ABERRATION
SINE CONDITION

ASTIGMATISM

DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

SPHERICAL ABERRATION
SINE CONDITION

ASTIGMATISM

DISTORTION(%)

F I G.10
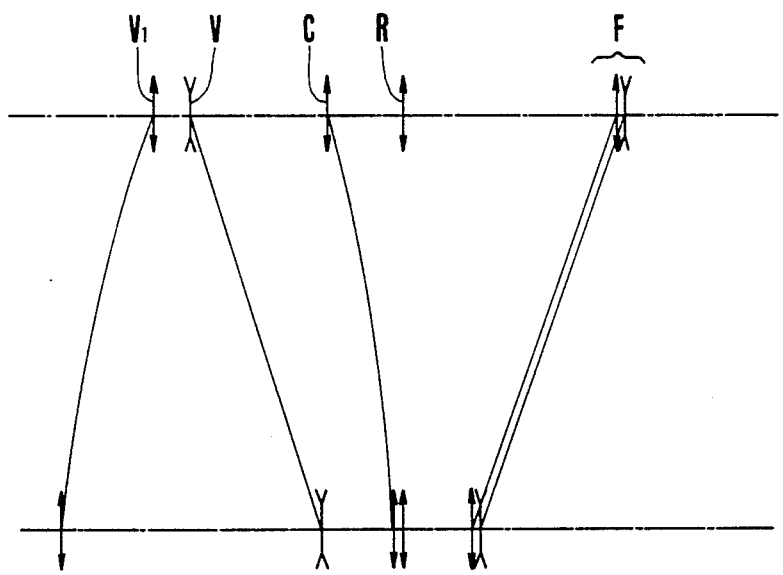

ZOOM LENS

This is a continuation of application Ser. No. 485,216, filed Apr. 15, 1983 now abandoned.

BACKGROUND OF THE INVENTION

1. Field of the Invention

This invention relates to zoom lenses, and, more particularly, to zoom lenses provided with a component of small refractive power movable along with a variator to effect a change in image magnification and which is made in part movable independently of the other to effect focusing.

2. Description of the Prior Art

In the past, for use as the focusing method for zoom lenses, impartment of independent movement to the front lens group, or the so-called front focusing method, has generally been well known.

For example, in the zoom lens comprising, from front to rear, a 1st lens group which remains stationary during zooming, a 2nd lens group movable for variation of the image magnification, a 3rd lens group movable for image shift compensation, and a 4th lens group or image forming system which is stationary during zooming, or the so-called 4-component mechanically compensated type zoom lens, when focusing from an infinitely distant object point to a close object point, the aforesaid 1st lens group is made to move axially. In this case, for a given finite object distance, the object point-to-image point relation of the aforesaid 1st lens group does not depend upon the focal length of the entire system, and, therefore, the amount of movement of the 1st lens group from the focusing position for the infinitely distant object takes a certain value no matter where the zooming position may be. This is the most important advantage of the focusing method by moving the front lens members. However, it has the following drawbacks also.

In the zoom lens of high zoom ratio with the longest focal length being relatively large, or the so-called telephoto zoom lens, upon consideration of good aberration correction, the total length of the entire lens system tends to become long, and the diameter of the front lens members also tends to become large. Moreover, for variation with focusing of aberrations being as reduced as possible, the construction and arrangement of the elements of the focusing lens group become complicated. Because of this, the weight of such lens group tends to become very heavy. With such zoom lens, when focusing is performed by moving the front lens group, there is need of a very large driving force. Further, to assure smoothness of the focusing operation, it is required that the mechanical mounting therefor be of satisfactory precision accuracy and durability.

Attempts have been made to overcome those drawbacks by dividing the focusing or 1st lens group into two parts, one of which is made movable for focusing. And many different proposals have been offered for such focusing method. By using this method, it is made relatively easy to reduce the total focusing movement and the weight of the movable part of the focusing lens group. In in application to auto-focus cameras, for example, however, the following drawback further arises.

For automatic focusing adjustment, the focusing control mechanism has to be operated with supply of a driving torque controlled by electrical signals, for example, from an electric motor lying in the interior of the camera. When the lens group to be driven is located farthest off from the rear side, or the drive source within the camera housing, therefore, the structure of transmission of the driving torque becomes complicated. For this reason, the lens system for use in auto-focus cameras is desired to fulfill the following requirements:

(a) the weight of the focusing lens group is light; and (b) the focusing lens group lies near the rear side.

The requirements described above appear such that any of the methods other than the front focusing method suffices. For example, in the case of the above-cited 4-component mechanically compensated zoom lens, the image forming or 4th lens group may be made movable in part or as a whole to effect focusing. As focusing starts from the position for an infinitely distant object, the required amount of movement of the focusing lens group is caused to change depending upon the focal length of the entire system, thus giving rise to an alternate problem. In general, such required amount of movement is lessened in the wide angle position, and increased in the telephoto position, the ratio being proportional to almost the 2nd power of the zoom ratio.

The use of such differential focusing movements with the focal length of the entire system in the zoom lens, when applied as the objective lens of, for example, autofocus cameras, leads to the necessity of designing the operating mechanism in such a way that in the telephoto positions where the total focusing movement is longer, the focusing lens members are driven to move at a faster speed than that when in the wide angle positions, while maintaining high accuracy of adjustment control at any zooming station.

The fact that the adjustment in position of the focusing lens group is differentiated by the zooming position is not advantageous when considered simplification of the structure of the mechanism.

In order that the difference between the required amounts of focusing movement in the wide angle and telephoto positions is moderated by any value however small it may be, it should be now considered that the focusing lens group is made movable when zooming.

This can take either of the following two main forms:

(1) Since the focusing lens group is made to move during zooming, the resultant change in the relative position of the focusing lens group causes the image magnification of the focusing lens group to change, thereby the difference between the speeds of focusing movement in the wide angle and telephoto positions is reduced.

(2) The focusing lens group is constructed with a plurality of subgroups which are made movable independently of each other when zooming, so that the focusing lens group itself changes its refractive power, thereby the difference between the speeds of focusing movement in the wide angle and telephoto positions is reduced.

Since, however, both of the means are to move the focusing lens group during zooming, as a matter of course, the paths of movement of the other zoom groups are caused to change from those which would otherwise be made when the focusing lens group is held stationary during zooming, leaving a high possibility that a solution will not be found for movement of that zoom group which is for compensating for the image shift, or of further increasing the refractive power of the magnification varying lens group to obtain a desired zoom ratio.

It is generally proven that the concurrent impartment of a movement into the focusing lens group with zooming for the purpose of reducing the difference between the required amounts of movement in the wide angle and telephoto positions results in a large effect of reverse change of the magnification by that focusing movement, and is not always preferable when trying to achieve a high range of variation of the image magnification.

As the zoom lens having the focusing provision in one of the lens groups which lie in rear of the variator, mention may be made of those disclosed in Japanese Laid-Open patent application Nos. Sho 56-165106 and Sho 56-165107.

SUMMARY OF THE INVENTION

It is an object of the present invention to provide a zoom lens employing a focusing method having a little effect on the reverse change of the image magnification resulting from the impartment of dependent movement into the focusing lens group and suited to, for example, an auto-focus camera.

To achieve this object, one of the features of the invention is the construction and arrangement of the components in such a way that the zoom lens having at least one lens group axially movable to change the focal length of the entire system, or variator, and at least one lens group axially movable to maintain the constant position of the image plane, or compensator, is provided with a compound lens group consisting of a plurality of subgroups of lens members arranged upon zooming to move as a unit in rear of either, or both, of said two zoom groups and contributing to a small overall refractive power, whereby one of said subgroups of lens members is made movable for focusing.

BRIEF DESCRIPTION OF THE DRAWINGS

FIGS. 5-1 through -9 and FIGS. 6-1 through -9 are graphic representations of the aberrations of the lens of FIG. 3 with an object at infinity and at a distance of 3 meters from the image plane when zoomed in the wide angle, intermediate and telephoto positions indicated at (a), (b) and (c) respectively.

FIGS. 7-1 through -9 and 8-1 through -9 are similar graphs to FIGS. 5 and 6 except that the aberrations of the lens of FIG. 4 are represented.

FIGS. 9 and 10 are schematic diagrams of optical arrangements and the paths of zooming movement of embodiments 3 and 4 of the invention respectively.

DETAILED DESCRIPTION OF THE PREFERRED EMBODIMENTS

Figure 1:
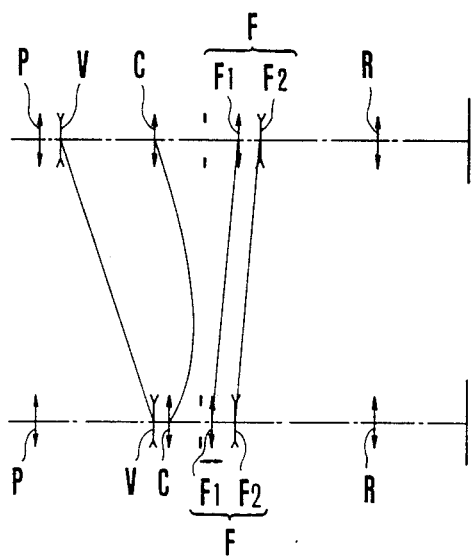
FIGS. 1 and 2 are schematic diagrams illustrating the optical arrangements of embodiments 1 and 2 of the invention along with the paths of movement of the zoom groups thereof.

In the zoom lens according to the invention, the overall refractive power of the compound lens group F for focusing is made so small that the impartment of dependent movement on those of the variator and compensator into the compound lens group F effects little reverse change of the image magnification, and the aberrations also produced can be limited to a very small level. And focusing is provided by moving one of the subgroups of the compound group F which has a refractive power of some magnitude with an advantage that the total focusing movement can be lessened.

Another advantage arising from the use of that lens group which lies relatively near to the image plane as the focusing group is that the driving torque transmission from the camera body can be constructed in a simple form. Therefore, it is preferred to apply it to cameras having automatic focus adjustment.

Further, because of making the focusing provision at part of the compound lens group F, as the relative position of the movable part for focusing changes, the image magnification differs, thereby it is made possible to achieve the possibility of reducing the difference in the speed of focusing movement between the wide angle and telephoto positions. In this connection, it should be also pointed out that a modification may be made such that when in the wide angle positions, that subgroup of the compound lens group F which has a small refractive power is selected for employment as the focusing part, while in the telephoto position, another subgroup which has a large refractive power is selected to perform focusing, thereby the difference between the required amounts of focusing movement in the wide angle and telephoto positions can be reduced.

And, since the compound lens group F is arranged in the rear of either, or both, of the lens group V and the lens group C, the focusing operation becomes easy and the driving mechanism is simple.

Though the above-stated rules of design suffice to accomplish the object of the invention, when a further improvement is desired to achieve, it is preferred to satisfy the following condition:

$$-1/3f_T < 1/f_F < 1/3f_T \qquad (1)$$

where $f_T$ is the longest focal length of the entire lens system, and $f_F$ is the focal length of the compound lens group F which is a small refractive power.

By making determination of the focal length $f_F$ within such range, a dependent movement on zooming can be imparted into the compound lens group F without involving a large reverse effect on change of the image magnification and with the limitation of the produced aberrations to a minimum.

When either the upper limit or the lower limit of inequalities of condition (1) is violated, an objectionably large reverse change of the image magnification results, and, therefore, a valuable increase in the zoom ratio is hardly achieved. It also results that large aberrations are produced, which are difficult to correct for good optical performance.

It is preferred that the compound lens group F of the invention is constructed with two subgroups of which the refractive powers are of opposite sign, as one of the two subgroups is made movable to effect focusing.

For the overall refractive power of the two subgroups to be made as small as possible, while still preserving an adequate focusing performance, there is need for the focusing subgroup to take at somewhat large a value of refractive power. With this in mind, the compound lens group F is formed by the positive and negative subgroups, thereby giving an advantage that the lens design is easy. An additional advantage is that the operating mechanism for the lens can be constructed in a simple form.

The invention also makes it possible that the compound lens group F can be constructed with three or more subgroups, any two of which are made movable either as a unit, or in differential relation to each other, to effect focusing.

The use of such method provides good stability of aberration correction throughout the focusing range, and, therefore, is preferred when improved results with respect to the imaging performance of the zoom lens are to be attained.

The present invention is next be described in connection with embodiments thereof by reference to the drawings.

Figure 2:
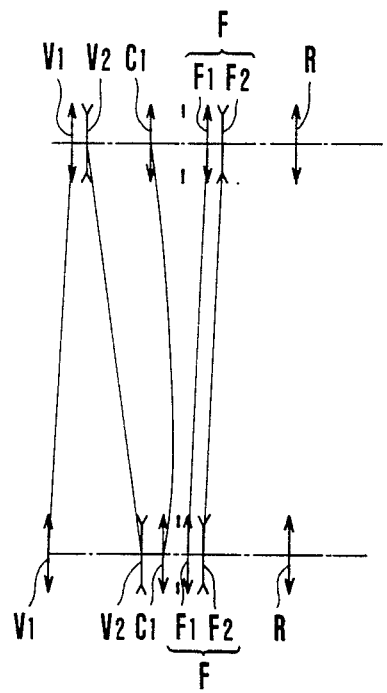

FIGS. 1 and 2 schematically illustrate embodiments 1 and 2 of zoom lenses according to the present invention along with how to focus the optical system.

In FIG. 1, V is a lens group for variation of the magnification, C is a lens group for image shift compensation, and F is a compound lens group having a front subgroup F1 of positive power and a rear subgroup F2 of negative power. The compound lens group F is made to move with zooming, and when focusing, independent movement is imparted to either one of the lens subgroups F1 and F2. P is a lens group arranged in front of the lens group V, and R is an image forming lens group, the lens groups P and R not necessarily being employed.

In FIG. 2, V1 and V2 are lens groups constituting a variator, the other lens groups being similar to those in FIG. 1.

Focusing is performed similarly to FIG. 1 lens, or by moving either the lens group F1 or the lens group F2. Although the embodiments 1 and 2 have been described in connection with the compound lens group F as consisting of two subgroups, another form using three or more constituent subgroups, needless to say, may be employed.

Examples of specific zoom lenses employing the focusing method of the invention shown in FIGS. 1 and 2 can be constructed in accordance with the numerical data for the radii of curvature, R, the axial thicknesses and air separations, D, and the refractive indices and Abbe numbers, N and ν, respectively of the glasses of the lens elements, with the subscripts numbered consecutively from front to rear.

Figure 3:
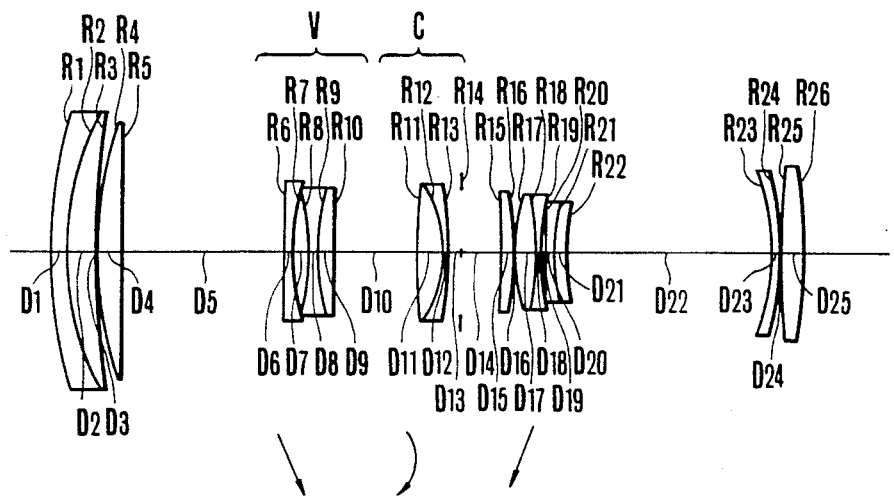
FIGS. 3 and 4 are longitudinal section views of examples 1 and 2 of specific zoom lenses of the invention.
Figure 4:
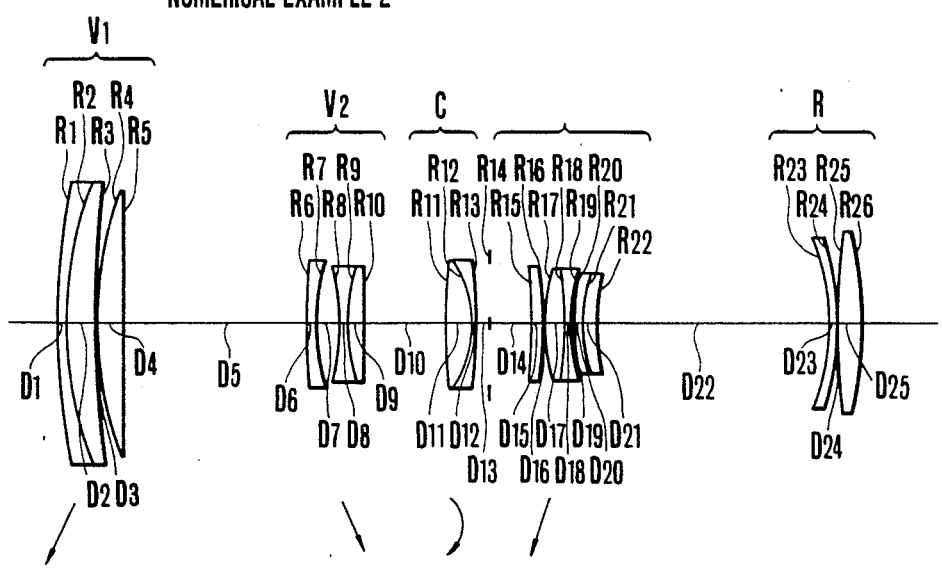

In the following tables, R14 indicates a stop plane. The longitudinal sections of the examples 1 and 2 of the zoom lenses are illustrated in FIGS. 3 and 4 respectively.

EXAMPLE 1

| F = 71.8–196.8 | FNO = 1:4.5 | 2ω = 12.6°–33.4° | |
|---|---|---|---|
| R1 = 98.48 | D1 = 2.80 | N1 = 1.80518 | ν1 = 25.4 |
| R2 = 60.49 | D2 = 6.75 | N2 = 1.61800 | ν2 = 63.4 |
| R3 = 200.30 | D3 = 0.10 | | |
| R4 = 76.83 | D4 = 4.80 | N3 = 1.60311 | ν3 = 60.7 |
| R5 = 1153.79 | D5 = Variable | | |
| R6 = 451.02 | D6 = 1.50 | N4 = 1.69680 | ν4 = 55.5 |
| R7 = 37.87 | D7 = 4.23 | | |
| R8 = −38.81 | D8 = 1.50 | N5 = 1.71300 | ν5 = 53.8 |
| R9 = 63.08 | D9 = 3.40 | N6 = 1.84666 | ν6 = 23.9 |
| R10 = −207.38 | D10 = Variable | | |
| R11 = 109.95 | D11 = 6.00 | N7 = 1.77250 | ν7 = 49.6 |
| R12 = −23.71 | D12 = 0.80 | N8 = 1.85026 | ν8 = 32.3 |
| R13 = −70.59 | D13 = Variable | | |
| R14 = Stop | D14 = Variable | | |
| R15 = −1254.30 | D15 = 2.80 | N9 = 1.69350 | ν9 = 53.2 |
| R16 = −71.89 | D16 = 0.12 | | |
| R17 = 36.34 | D17 = 4.80 | N10 = 1.69350 | ν10 = 53.2 |
| R18 = −88.79 | D18 = 1.50 | N11 = 1.85026 | ν11 = 32.3 |
| R19 = 68.36 | D19 = 1.02 | | |
| R20 = −3113.92 | D20 = 1.00 | N12 = 1.77250 | ν12 = 49.6 |
| R21 = 31.17 | D21 = 3.00 | N13 = 1.84666 | ν13 = 23.9 |

EXAMPLE 1-continued

| F = 71.8–196.8 | FNO = 1:4.5 | 2ω = 12.6°–33.4° | |
|---|---|---|---|
| R22 = 41.54 | D22 = Variable | | |
| R23 = −42.78 | D23 = 2.00 | N14 = 1.67270 | ν14 = 32.1 |
| R24 = −59.31 | D24 = 0.20 | | |
| R25 = 540.54 | D25 = 5.00 | N15 = 1.71300 | ν15 = 53.8 |
| R26 = −76.05 | | | |
| f | 71.8 | 136.7 | 196.8 |
| D5 | 0.420 | 34.752 | 42.675 |
| D10 | 34.272 | 17.652 | 2.258 |
| D13 | 20.613 | 2.902 | 10.373 |
| D14 | 16.365 | 8.537 | 6.730 |
| D22 | 36.733 | 44.561 | 46.367 |

EXAMPLE 2

| F = 71.8–196.1 | FNO = 1:4.5 | 2ω = 12.6°–33.5° | |
|---|---|---|---|
| R1 = 131.50 | D1 = 2.20 | N1 = 1.80518 | ν1 = 25.4 |
| R2 = 77.96 | D2 = 6.50 | N2 = 1.61800 | ν2 = 63.4 |
| R3 = 348.60 | D3 = 0.10 | | |
| R4 = 86.98 | D4 = 5.00 | N3 = 1.61800 | ν3 = 63.4 |
| R5 = 951.80 | D5 = Variable | | |
| R6 = 279.54 | D6 = 1.50 | N4 = 1.69680 | ν4 = 55.5 |
| R7 = 38.60 | D7 = 5.61 | | |
| R8 = −39.44 | D8 = 1.50 | N5 = 1.69350 | ν5 = 53.2 |
| R9 = 53.74 | D9 = 3.40 | N6 = 1.84666 | ν6 = 23.9 |
| R10 = −493.02 | D10 = Variable | | |
| R11 = 107.84 | D11 = 6.00 | N7 = 1.78800 | ν7 = 47.4 |
| R12 = −22.83 | D12 = 0.80 | N8 = 1.85026 | ν8 = 32.3 |
| R13 = −75.83 | D13 = Variable | | |
| R14 = Stop | D14 = Variable | | |
| R15 = −469.30 | D15 = 2.80 | N9 = 1.69680 | ν9 = 55.5 |
| R16 = −74.68 | D16 = 0.12 | | |
| R17 = 34.84 | D17 = 4.80 | N10 = 1.69680 | ν10 = 55.5 |
| R18 = −90.13 | D18 = 1.50 | N11 = 1.85026 | ν11 = 32.3 |
| R19 = 70.06 | D19 = 0.90 | | |
| R20 = 381.99 | D20 = 1.00 | N12 = 1.77250 | ν12 = 49.6 |
| R21 = 28.93 | D21 = 3.00 | N13 = 1.84666 | ν13 = 23.9 |
| R22 = 36.87 | D22 = Variable | | |
| R23 = −45.55 | D23 = 1.88 | N14 = 1.67270 | ν14 = 32.1 |
| R24 = −60.76 | D24 = 0.19 | | |
| R25 = 232.13 | D25 = 4.71 | N15 = 1.71300 | ν15 = 53.8 |
| R26 = −90.19 | | | |
| f | 71.8 | 136.7 | 196.1 |
| D5 | 0.27 | 39.90 | 50.06 |
| D10 | 31.96 | 17.92 | 4.96 |
| D13 | 18.89 | 2.44 | 7.58 |
| D14 | 16.16 | 9.21 | 7.43 |
| D22 | 43.74 | 50.69 | 52.47 |

Numerical example 1 may be regarded as obtained by inserting into the above-described 4-component mechanically compensated zoom lens at the image forming system or 4th lens group thereof additional two lens groups of positive and negative refractive powers respectively which when combined produce a small refractive power, the R15 through R19 constituting that positive lens group which also serves to effect focusing. The required amount of focusing movement for a close object (at 3 meters from the image plane) as measured from the point in position for an infinitely distant object, is 0.46 mm for the wide angle positions and 2.99 mm for the telephoto positions, its ratio being found to be 6.5 as is smaller than the square of the zoom ratio, or 7.5. Thus, the difference between the required amounts of focusing movement in the wide angle and telephoto positions is reduced.

Numerical example 2 is that when zooming, a 1st lens group V1 of positive power for magnification variation, a 2nd lens group V2 of negative power for magnification variation, a 3rd lens group C of positive power for image shift compensation, a 4th lens group F1 and a 5th lens group F2 are moved in differential relation, whereby focusing is performed by the 4th lens group F1.

As the lens of numerical example 2 is focused down from infinity to a short object distance (1.5 meters), the 4th lens group defined by the R15 and R19 is moved axially forward by 0.96 mm when in the wide angle positions, and by 6.26 mm when in the telephoto positions. Its ratio, or 6.5 is found smaller than the square of the zoom ratio, or 7.5. Thus, a valuable decrease in the difference between the required amounts of focusing movement in the telephoto and wide angle positions is achieved.

Figures 1, 5:
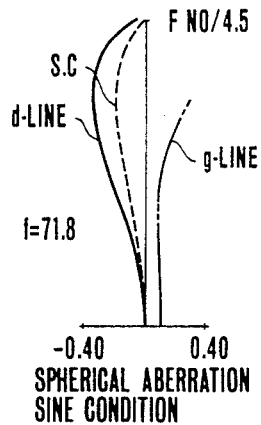
Figures 2, 5:
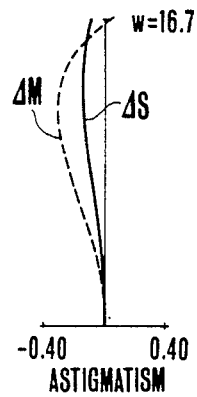
Figures 3, 5:
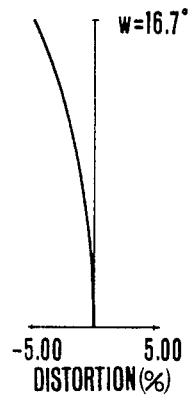
Figures 4, 5:
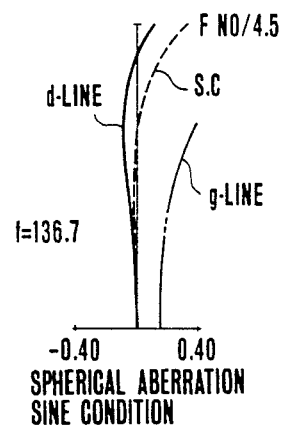
Figure 5:
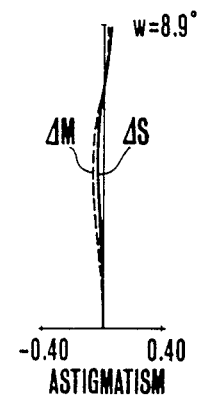
Figures 5, 6:
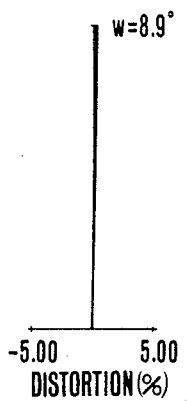
Figures 5, 6, 7:
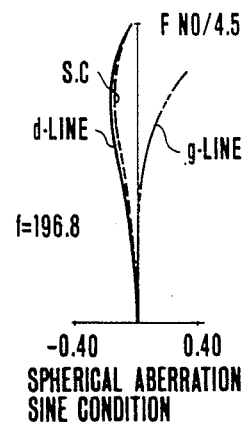
Figures 5, 6, 7, 8:
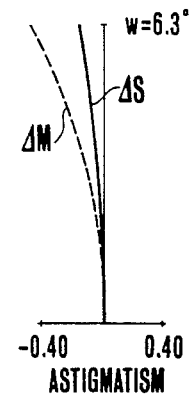
Figures 5, 6, 7, 8, 9:
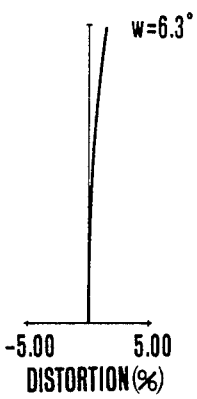
Figures 1, 6:
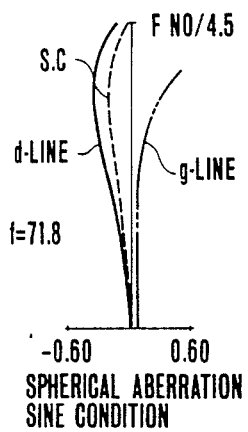
Figures 2, 6:
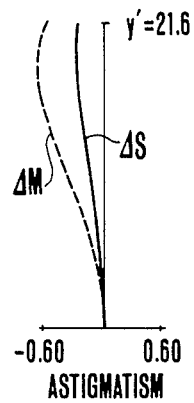
Figures 3, 6:
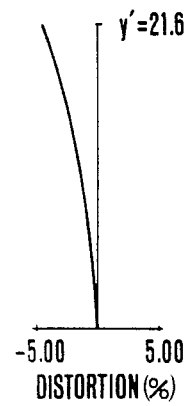
Figures 4, 6:
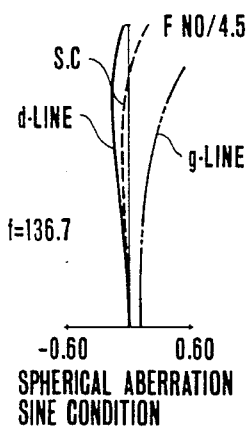
Figures 5, 6:
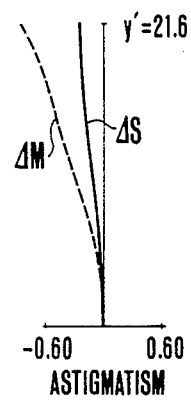
Figure 6:
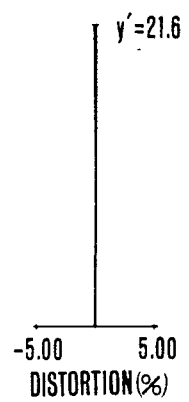
Figures 6, 7:
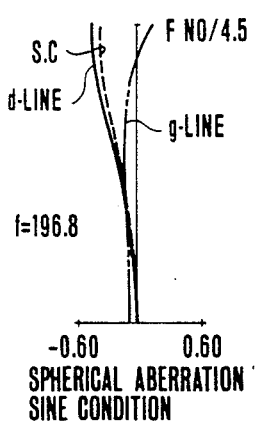
Figures 6, 7, 8:
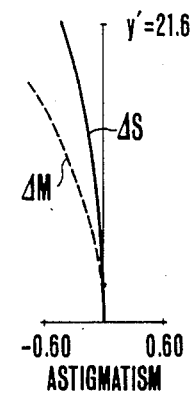
Figures 6, 7, 8, 9:
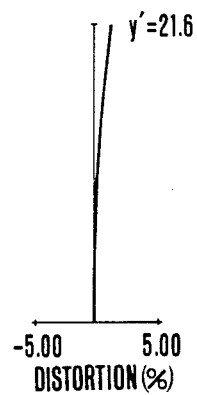
Figures 1, 7:
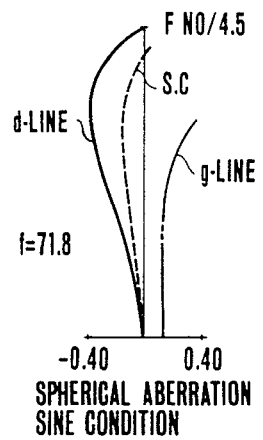
Figures 2, 7:
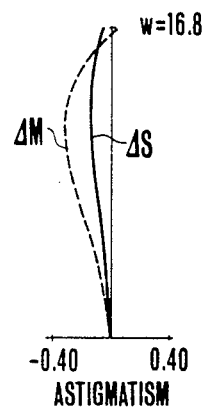
Figures 3, 7:
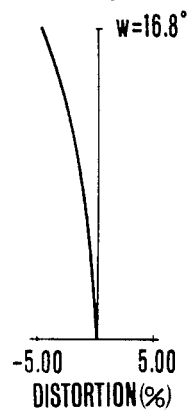
Figures 4, 7:
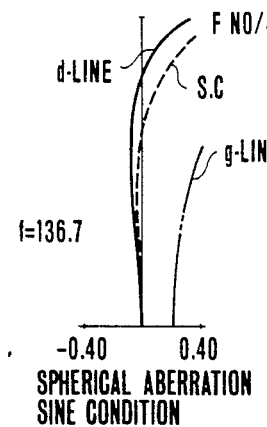
Figures 5, 7:
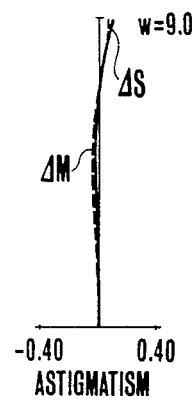
Figures 6, 7:
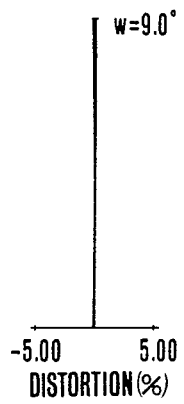
Figure 7:
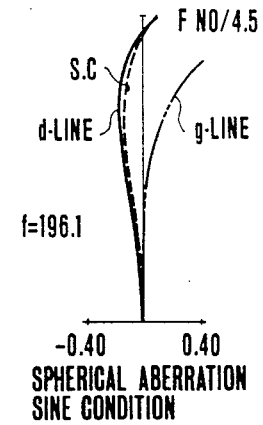
Figures 7, 8:
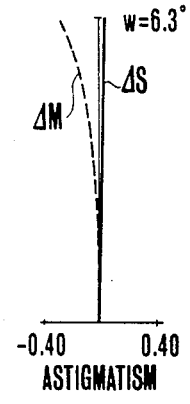
Figures 7, 8, 9:
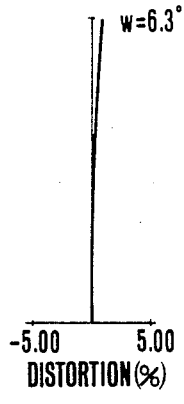
Figures 1, 8:
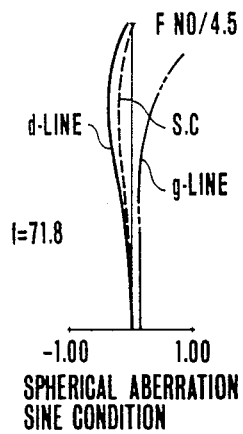
Figures 2, 8:
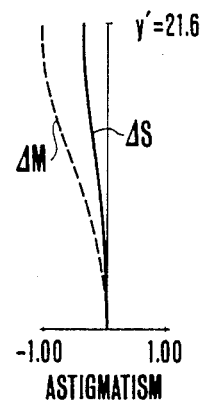
Figures 3, 8:
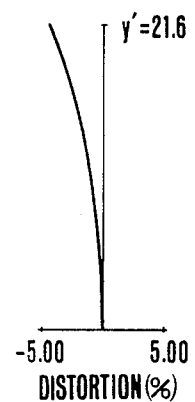
Figures 4, 8:
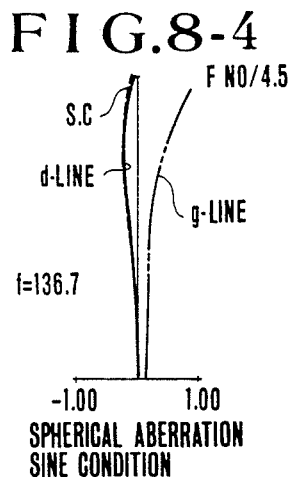
Figures 5, 8:
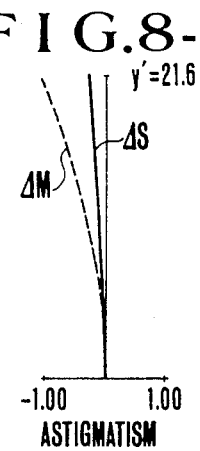
Figures 6, 8:
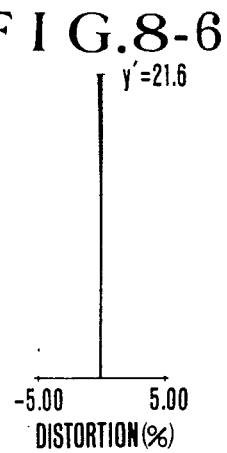
Figures 7, 8:
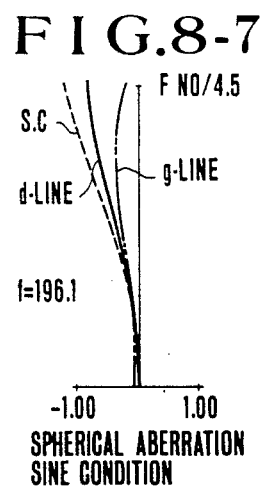
Figure 8:
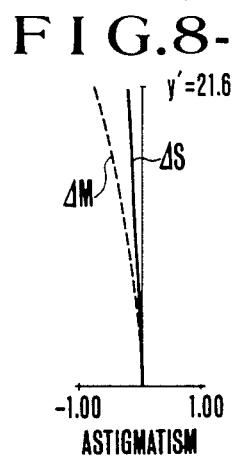
Figures 8, 9:
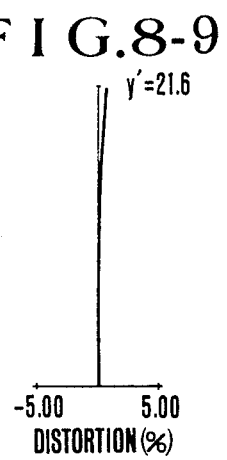
Figure 9:
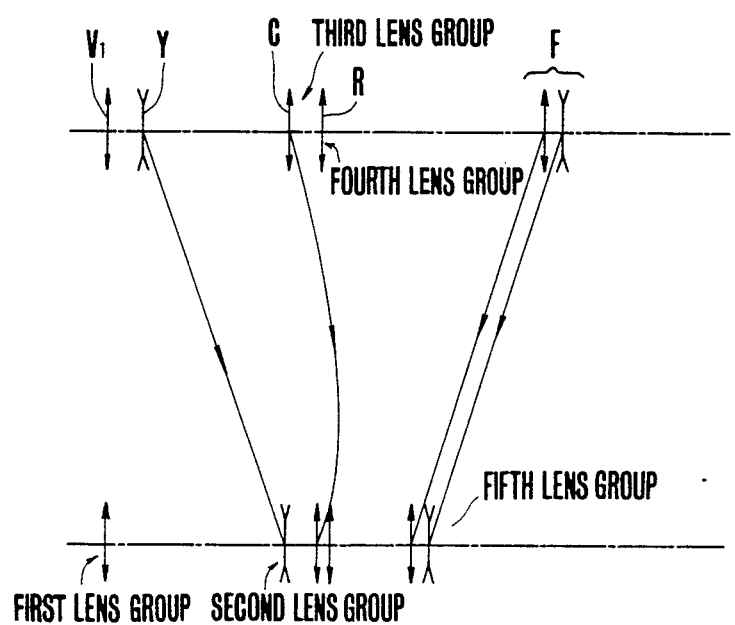

FIG. 9 illustrates the zoom lens of the invention by the specific embodiment 3. In the drawing, V1 is a 1st lens group which is stationary during zooming, and V is a 2nd lens group axially movable when zooming. By changing the relative position of said V1 and V, the image magnification is changed. C is a 3rd lens group axially movable for maintaining the constant position of the image plane, and R is a stationary 4th lens group by which determination of the focal length of the entire lens system within a proper range is made. F is a 5th lens group comprised of, from front to rear, a positive lens group and a negative lens group which move as a unit when zooming. The overall refractive power of the aforesaid 5th lens group in terms of the refractive power of the entire system taken at the telephoto position, $\phi T$, is defined by $0.146\phi T$, so that though moving along the optical axis, the resultant amount of the focal length of the entire system changed is small enough to be negligible on actual practice.

Focusing is carried out by moving the rear or negative lens group of the aforesaid 5th lens group F alone, the amount of focusing movement from the position for an infinitely distant object varying with object distance as tabulated below.

FIG. 10 illustrates the zoom lens of the invention by the specific embodiment 4. What is different from the 3rd embodiment resides in the point that the 1st lens group V1 moves when zooming. It is known that with the 1st lens group V1 made movable as has been described above, the zoom lens can be constructed in the compact form as a whole. The following table, similarly to the embodiment 3, gives the values of the amount of focusing movement for discrete object distance.

EMBODIMENT 3

| | Focal Length | Interval between the Principal Points in Wide Angle Position | Interval between the Principal Points in Telephoto Position |
| --- | --- | --- | --- |
| 1st Lens group | 108.33 mm | | |
| | | 9.5 mm | 51.6 |
| 2nd Lens group | −34.02 | | |
| | | 42.12 | 9.20 |
| 3rd Lens group | 94.26 | | |
| | | 8.92 | 0 |
| 4th Lens group | 116.43 | | |
| | | 64.0 | 27.0 |
| Front 5th Lens group | 120.00 | | |
| | | 5.0 | 5 |
| Rear 5th Lens group | −105.91 | | |

Focal Length Range 70.0–204.27 mm
Movements of Focusing Lens

| | Focal Length | | |
| --- | --- | --- | --- |
| Object Distance | 70 | 140 | 204 |
| 2 m | 2.60 mm | 5.78 | 11.08 |
| 3 | 1.68 | 3.73 | 7.04 |
| 4 | 1.24 | 2.76 | 5.16 |
| 5 | 0.98 | 2.19 | 4.08 |

The overall focal length of the 5th lens group
f5 = −1398.25 mm

EMBODIMENT 4

| | Focal Length | Interval between the Principal Points in Wide Angle Position | Interval between the Principal Points in Telephoto Position |
| --- | --- | --- | --- |
| 1st Lens group | 144.00 mm | | |
| | | 9.5 mm | 67.50 |
| 2nd Lens group | −34.02 | | |
| | | 35.0 | 18.92 |
| 3rd Lens group | 78.00 | | |
| | | 20.0 | 2.08 |
| 4th Lens group | 103.37 | | |
| | | 55.0 | 18.00 |
| Front 5th Lens group | 168.00 | | |
| | | 2.0 | 2.00 |
| Rear 5th Lens group | −164.00 | | |

Focal Length Range 60.0–142.68 mm
Movements of Focusing Lens

| | Focal Length | | |
| --- | --- | --- | --- |
| Object Distance | 60 | 100 | 142 |
| 2 m | 3.53 mm | 5.72 | 9.52 |
| 3 | 2.27 | 3.70 | 6.13 |

EMBODIMENT 4-continued

| 4 | 1.67 | 2.73 | 4.52 |
|---|------|------|------|
| 5 | 1.32 | 2.17 | 3.58 |

The overall focal length of the 5th Lens Group
f5 = −13791.2 mm

Besides the four embodiments described above, it is possible to provide another construction and arrangement that realizes the zoom lens of the invention. For example, counting from front, a 1st lens group C of negative refractive power, a 2nd lens group V1 of positive refractive power, and a 3rd lens group F of small overall refractive power constitute the lens system, wherein focusing is carried out by part of said 3rd lens group F.

What we claim:

1. A zoom lens comprising:
   a plurality of lens units axially movable for the zooming of said zoom lens and stationary during focusing; and
   a compound lens unit, having a focusing sub-unit axially movable for focusing from an infinitely distant object to a close object and a further sub-unit stationary during focusing, lying on the image side of at least one of said plurality of lens units, and arranged upon zooming to move axially as a unit along with said plurality of lens units; said focusing and further lens units having substantially the same but opposite refractive powers so that the overall power of the compound lens unit is so small as to have substantially no influence on the zooming.

2. A zoom lens according to claim 1, satisfying $$-1/3f_T < 1/f_F < 1/3f_T$$

where $f_F$ is the focal length of said compound lens unit, and $f_T$ is the focal length of the entire system at the telephoto side of the zooming range of said zoom lens.

3. A zoom lens according to claim 1, wherein said focusing sub-unit has a positive refractive power and the other sub-unit has a negative refractive power.

4. A zoom lens according to claim 1, wherein at least one of said plurality of lens units axially moves to vary the magnification power and another one axially moves to compensate for the shift of the image plane.

5. A zoom lens comprising:
   a plurality of lens units axially movable for zooming and stationary during focusing from an infinitely distant object to a close object; and
   a compound lens unit having a plurality of sub-units arranged to move axially along with said lens units when zooming, and to change their axial separations to effect focusing, whereby satisfying $$-1/3f_T < 1/f_F < 1/3f_T$$

where $f_F$ is the focal length of said compound lens unit and $f_T$ is the longest focal length of the entire system.

* * * * *